United States Patent
King et al.

(10) Patent No.: US 9,866,268 B2
(45) Date of Patent: *Jan. 9, 2018

(54) RADIO FREQUENCY SYSTEMS WITH TRANSMIT AND RECEIVE ISOLATION

(71) Applicant: SKYWORKS SOLUTIONS, INC., Woburn, MA (US)

(72) Inventors: Joel Richard King, Newbury Park, CA (US); David Richard Pehlke, Westlake Village, CA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,222

(22) Filed: Oct. 6, 2016

(65) Prior Publication Data

US 2017/0026074 A1   Jan. 26, 2017

Related U.S. Application Data

(63) Continuation of application No. 13/862,228, filed on Apr. 12, 2013, now Pat. No. 9,496,913.

(Continued)

(51) Int. Cl.
*H04B 1/525* (2015.01)
*H04B 1/44* (2006.01)
(Continued)

(52) U.S. Cl.
CPC ........... *H04B 1/525* (2013.01); *H04B 1/0057* (2013.01); *H04B 1/44* (2013.01); *H04B 17/336* (2015.01); *H04L 5/14* (2013.01); *H04L 43/028* (2013.01)

(58) Field of Classification Search
None
See application file for complete search history.

(56) References Cited

U.S. PATENT DOCUMENTS 6,075,500 A   6/2000   Kurz et al.
7,057,472 B2  6/2006   Fukamachi et al.
(Continued)

FOREIGN PATENT DOCUMENTS

CN   101002393 A   7/2007
JP   2004/343696   12/2004
(Continued)

OTHER PUBLICATIONS

International Search Report and Written Opinion for Application No. PCT/US2013/036495, dated Sep. 16, 2013.

*Primary Examiner* — Alejandro Rivero
(74) *Attorney, Agent, or Firm* — Knobbe Martens Olson & Bear LLP

(57) ABSTRACT

Radio frequency systems with transmit and receive isolation are provided. In certain configurations, a wireless device includes a power amplifier including a power amplifier output configured to provide a transmit signal, one or more duplexers including a first duplexer associated with a first frequency band, a plurality of antennas including a first antenna and a second antenna, a plurality of switches, and an isolation detection system. The plurality of switches are configured to selectively connect the power amplifier output to the first antenna via a selected path chosen from a plurality of signal paths, including a first signal path through the first duplexer and a duplexer bypass path that bypasses the one or more duplexers. Additionally, the isolation detection system is configured to control the selected path of the plurality of switches based on detecting an amount of antenna coupling between the first antenna and the second antenna.

20 Claims, 11 Drawing Sheets

Related U.S. Application Data

(60) Provisional application No. 61/623,434, filed on Apr. 12, 2012.

(51) Int. Cl.
  *H04B 1/00* (2006.01)
  *H04B 17/336* (2015.01)
  *H04L 5/14* (2006.01)
  *H04L 12/26* (2006.01)

(56) References Cited

U.S. PATENT DOCUMENTS

| | | |
|---|---|---|
| 7,656,251 B1 | 2/2010 | Bauder et al. |
| 9,397,721 B2 | 7/2016 | Pehlke et al. |
| 9,496,913 B2 | 11/2016 | King et al. |
| 2003/0104796 A1* | 6/2003 | Yoon ............... H04B 7/0602 455/78 |
| 2004/0018819 A1 | 1/2004 | Coan |
| 2005/0094744 A1 | 5/2005 | Ramachandran et al. |
| 2007/0066245 A1 | 3/2007 | Snider |
| 2008/0212552 A1 | 9/2008 | Fukamachi et al. |
| 2009/0124213 A1* | 5/2009 | Rubin ............... H04B 1/406 455/76 |
| 2010/0029332 A1 | 2/2010 | Fox |
| 2010/0227570 A1* | 9/2010 | Hendin ............... H04B 1/006 455/78 |
| 2011/0043285 A1 | 2/2011 | Zhao et al. |
| 2011/0175789 A1 | 7/2011 | Lee et al. |
| 2011/0187478 A1 | 8/2011 | Link et al. |
| 2011/0237207 A1* | 9/2011 | Bauder ............... H01Q 1/521 455/78 |
| 2012/0202561 A1 | 8/2012 | Robinett |
| 2012/0243446 A1 | 9/2012 | Mueller et al. |
| 2012/0257523 A1 | 10/2012 | Kasturi |
| 2013/0137475 A1 | 5/2013 | Rousu et al. |
| 2013/0265912 A1 | 10/2013 | Ikonen et al. |
| 2014/0329475 A1* | 11/2014 | Ella ............... H04B 1/006 455/77 |

FOREIGN PATENT DOCUMENTS

| | | |
|---|---|---|
| JP | 2008/005182 | 1/2008 |
| WO | WO 2011/146404 A1 | 11/2011 |

\* cited by examiner

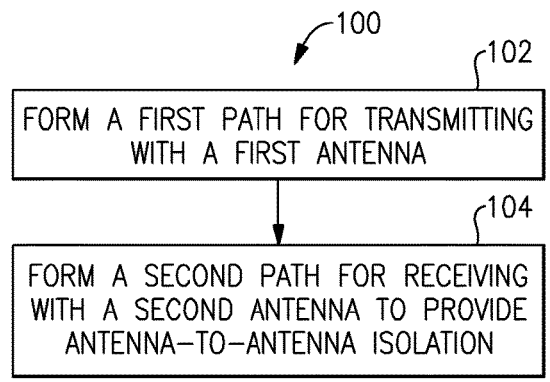
FIG.4
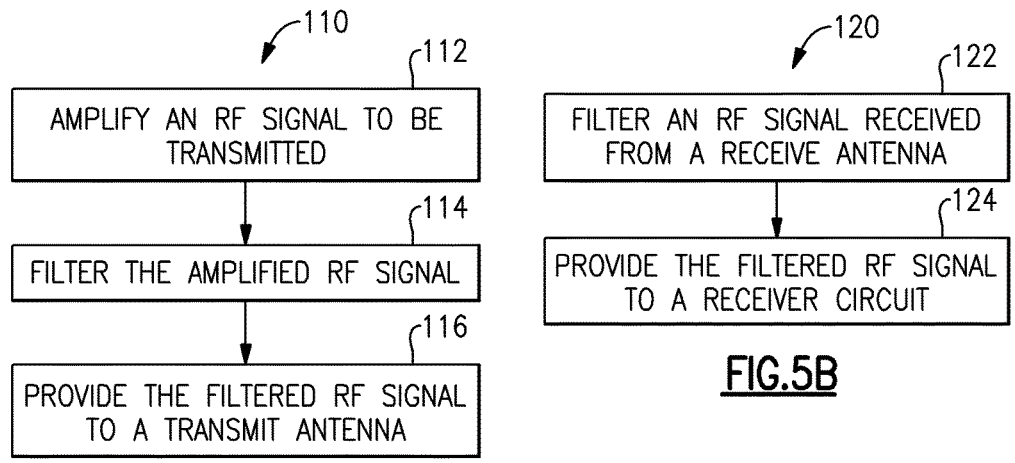
FIG.5A
FIG.5B

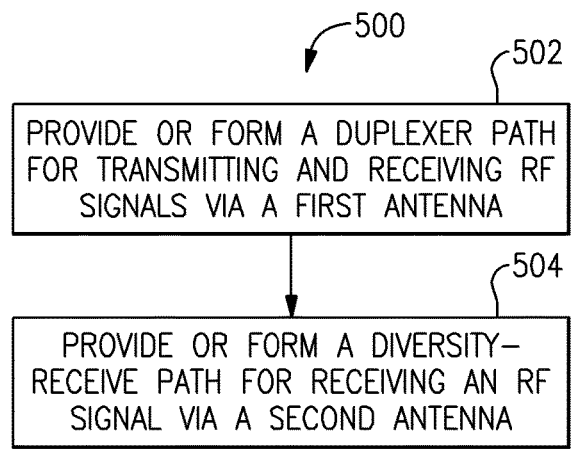
FIG.9
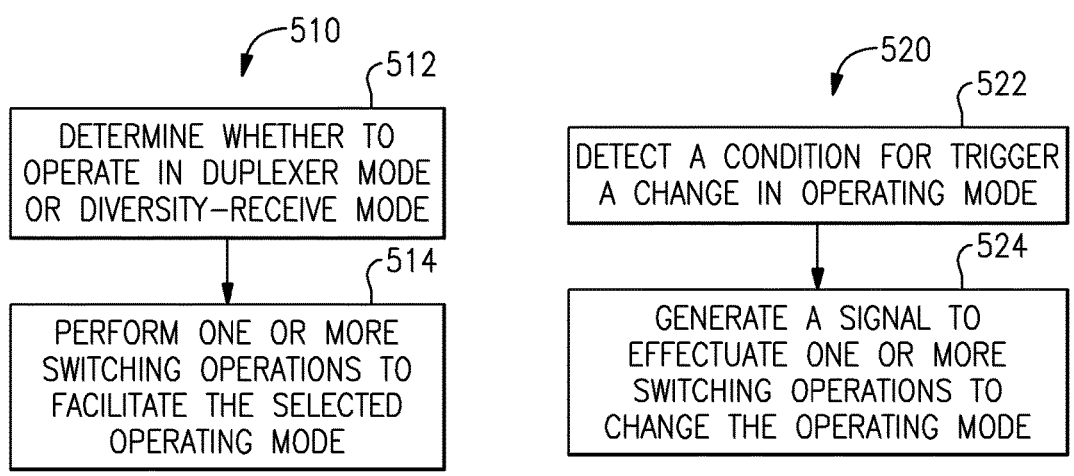
FIG.10
FIG.11

ID FREQUENCY SYSTEMS WITH
RADIO FREQUENCY SYSTEMS WITH TRANSMIT AND RECEIVE ISOLATION

CROSS-REFERENCE TO RELATED APPLICATIONS

This application is a continuation of U.S. patent application Ser. No. 13/862,228, filed Apr. 12, 2013 and titled "SYSTEMS AND METHODS RELATED TO IMPROVED ISOLATION BETWEEN TRANSMIT AND RECEIVE RADIO-FREQUENCY SIGNALS," which claims the benefit of priority under 35 U.S.C. §119(e) of U.S. Provisional Patent Application No. 61/623,434 filed Apr. 12, 2012 and titled "SYSTEMS AND METHODS RELATED TO IMPROVED ISOLATION BETWEEN TRANSMIT AND RECEIVE RADIO-FREQUENCY SIGNALS," each of which are herein incorporated by reference in their entireties.

BACKGROUND

Field

The present disclosure generally relates to systems and methods for improving isolation between transmit and receive radio-frequency (RF) signals.

Description of the Related Art

A radio-frequency (RF) device such as a wireless device often includes a transmitter and a receiver for generating a Tx signal and process an Rx signal, respectively. Isolation of such signals in their respective paths to and from one or more antennas is an important performance consideration. For example, isolation between Tx and Rx signals can facilitate improvement or optimization of radio communication links.

SUMMARY

In some implementations, the present disclosure relates to a system for isolating radio-frequency (RF) signals during Tx and Rx operations. The system includes a transmit path configured for passage of a first RF signal. The system further includes a first filter disposed along the transmit path and configured to filter the first RF signal. The system further includes a first antenna connected to the transmit path and configured to transmit the first RF signal. The system further includes a second antenna connected to a receive path and configured to receive a second RF signal. The first and second antennas are separated from each other to yield a desired level of isolation between the transmit and receive paths.

In some embodiments, the system can further include a second filter disposed along the receive path and configured to filter the second RF signal for processing by a receiver circuit. The receive path can include a diversity receive path. Each of the first and second filters can include a relaxed filtering requirement due at least in part to the separate first and second antennas. The relaxed filtering requirement can allow reduction in insertion losses for both of the transmit and receive paths. The relaxed filtering requirement can include a relaxed out-of-band attenuation requirement.

In some embodiments, each of the first and second filter can include a band-pass filter (BPF).

In some embodiments, the transmit path can include a power amplifier having a plurality of interstages. In some embodiments, the first filter can be disposed at one of the interstages and before an output stage of the power amplifier. The interstages can include a variable-gain stage configured to compensate for variation of insertion loss at the first filter. The variation of insertion loss can include insertion loss variation due to change in frequency or temperature.

In some embodiments, the system can further include a duplexer path configured to facilitate a duplexer mode where both transmit and receive operations are performed with the first antenna. In some embodiments, the system can further include a duplexer bypass and one or more switches to allow switching between the duplexer mode and a duplexer bypass mode where both of the first and second antennas are being used. The duplexer bypass mode can be engaged for bypassing the duplexer over selected regions of dynamic range to optimize performance. In some embodiments, each of the transmit path, receive path, and duplexer path can include a plurality of channels for facilitating multi-band operations. In some embodiments, the multi-band operation can include a quad-band for a 3GPP communication standard.

In some embodiments, the system can further include a detection system configured to detect a condition for switching between the duplexer mode and the duplexer bypass mode. The condition can be representative of an antenna isolation environment. The antenna isolation environment condition can be detected by an Rx diversity measurement analysis, a forward and reflected coupled power measurement, a direct measurement of the first RF signal transmitted, or a comparison to one or more calibrated reference values.

In some embodiments, the Tx and Rx operations can be performed substantially simultaneously.

In accordance with a number of implementations, the present disclosure relates to a radio-frequency (RF) module that includes a packaging substrate configured to receive a plurality of components. The module further includes a circuit configured to provide isolation of RF signals during Tx and Rx operations. The circuit includes a transmit path configured for passage of a first RF signal, a first filter disposed along the transmit path and configured to filter the first RF signal, and a transmit node for connecting to a first antenna for transmitting the first RF signal. The circuit further includes a receive path configured to receive a second RF signal from a second antenna. The transmit path and the receive path are configured to yield a desired level of isolation therebetween. The module further includes a plurality of connectors configured to provide electrical connections between the circuit and the packaging substrate.

In a number of implementations, the present disclosure relates to a radio-frequency (RF) device that includes a transceiver configured to process RF signals. The RF device further includes first and second antennas in communication with the transceiver to facilitate transmission and reception of the RF signals. The RF device further includes a circuit configured to provide isolation of the RF signals during Tx and Rx operations. The circuit includes a transmit path configured for passage of a first RF signal, a first filter disposed along the transmit path and configured to filter the first RF signal, and a transmit node for connecting to the first antenna for transmitting the first RF signal. The circuit further includes a receive path configured to receive a second RF signal from the second antenna. The transmit path and the receive path are configured to yield a desired level of isolation therebetween.

According to some implementations, the present disclosure relates to a method for isolating radio-frequency (RF) signals during Tx and Rx operations. The method includes passing a first RF signal through a transmit path. The method further includes filtering the first RF signal along the transmit path. The method further includes passing the first RF signal to a first antenna to transmit the first RF signal. The method further includes receiving a second RF signal through a second antenna. The method further includes passing the second RF signal through a receive path. The first and second antennas are separated from each other to yield a desired level of isolation between the transmit and receive paths.

In some implementations, the present disclosure relates to a method for fabricating a device having an isolation circuit. The method includes forming or providing a transmit path. The method further includes forming or providing a filter along the transmit path. The method further includes forming or providing a connection between the transmit path and a first antenna to allow transmission of a first RF signal. The method further includes forming or providing a receive path that is connected to a second antenna such that the transmit and receive paths are isolated by a desired level.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 4 shows a process that can be implemented to provide antenna-antenna isolation for a radio-frequency (RF) system having first and second antennas.

FIG. 5A shows a process that can be implemented to effectuate the transmit portion of the RF system of FIG. 4.

FIG. 5B shows a process that can be implemented to effectuate the receive portion of the RF system of FIG. 4.

FIG. 9 shows a process that can be implemented to effectuate receiving of RF signals through a plurality of antennas.

FIG. 10 shows a process that can be implemented to select a receive mode among the receiving modes of FIG. 9.

FIG. 11 shows a process that can be implemented to effectuate changes associated with the selection process of FIG. 10.

DETAILED DESCRIPTION OF SOME EMBODIMENTS

The headings provided herein, if any, are for convenience only and do not necessarily affect the scope or meaning of the claimed invention.

Figure 1:
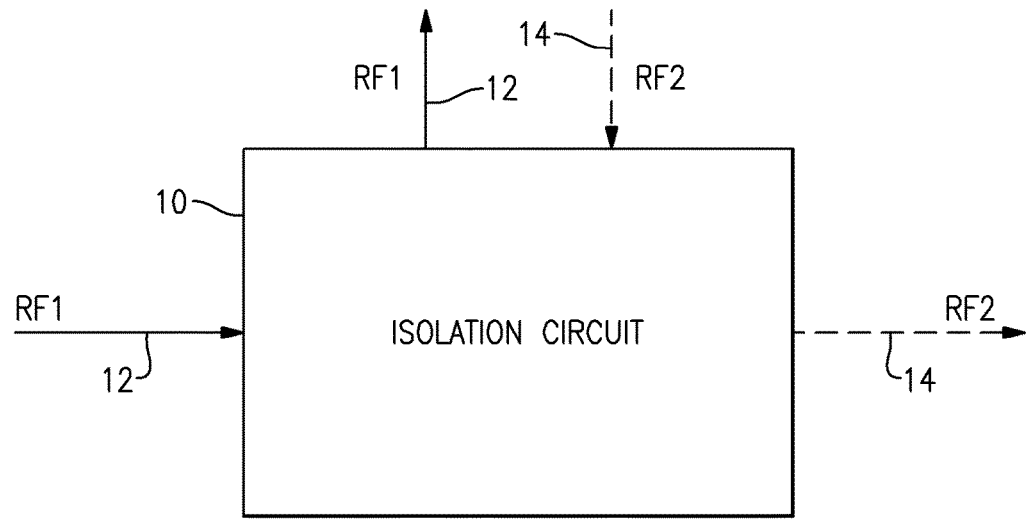
FIG. 1 schematically depicts an isolation circuit.

Disclosed herein are systems and methods related to improved isolation among radio-frequency (RF) signals. FIG. 1 shows an isolation circuit 10 configured to receive and output a first RF signal (RF1) 12 (e.g., a transmit signal), and also to receive and output a second RF signal (RF2) 14 (e.g., a receive signal). For the purpose of description herein, RF1 and RF2 will be described in the context of transmit and receive signals, respectively. However, it will be understood that one or more features of the present disclosure can also be implemented in other RF signal isolation situations.

Figure 2:
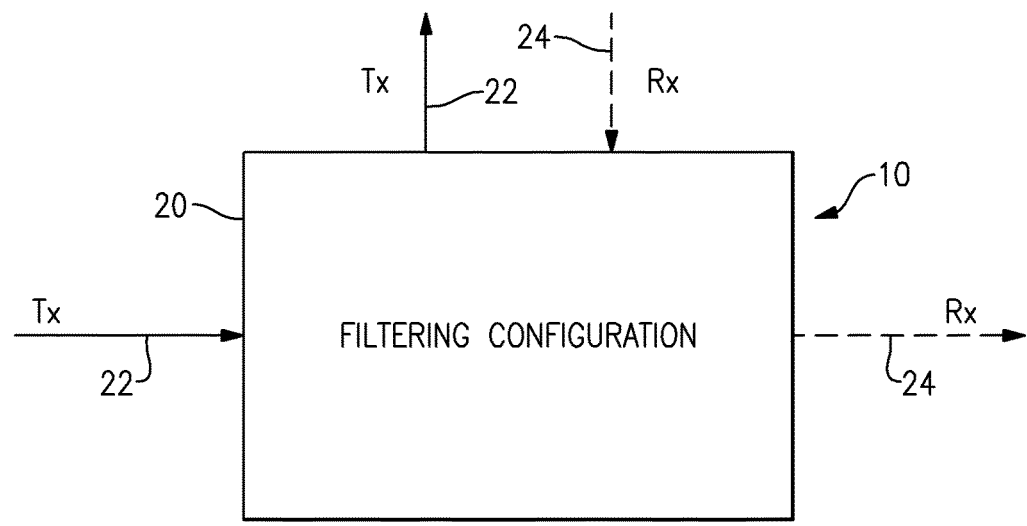
FIG. 2 shows that the isolation circuit of FIG. 1 can be implemented in a filtering configuration.

FIG. 2 shows that in some embodiments, the isolation circuit 10 of FIG. 1 can be implemented in a filtering configuration 20. Such a configuration is shown to accommodate passage of a transmit (Tx) signal 22 and a receive (Rx) signal 24. Various non-limiting examples of the filtering configuration 20 described herein can provide improved isolation between the Tx and Rx signals 22, 24.

Isolation between Tx and Rx signals can facilitate improvement or optimization of radio communication links, such as those involving significant out-of-band noise and spurious filtering. By way of an example, frequency division duplex (FDD) systems can involve transmit (Tx) and receive (Rx) circuits operating simultaneously but in different frequency bands within the same radio. Interference of a transmitter carrier power being transmitted, along with noise and spurious out-of-band signal of the transmitter can be a detriment to a receiver's ability to accurately demodulate desired incoming signals, especially when they are at low powers and close to the sensitivity limit at which the Rx is able to resolve them.

Figure 3:
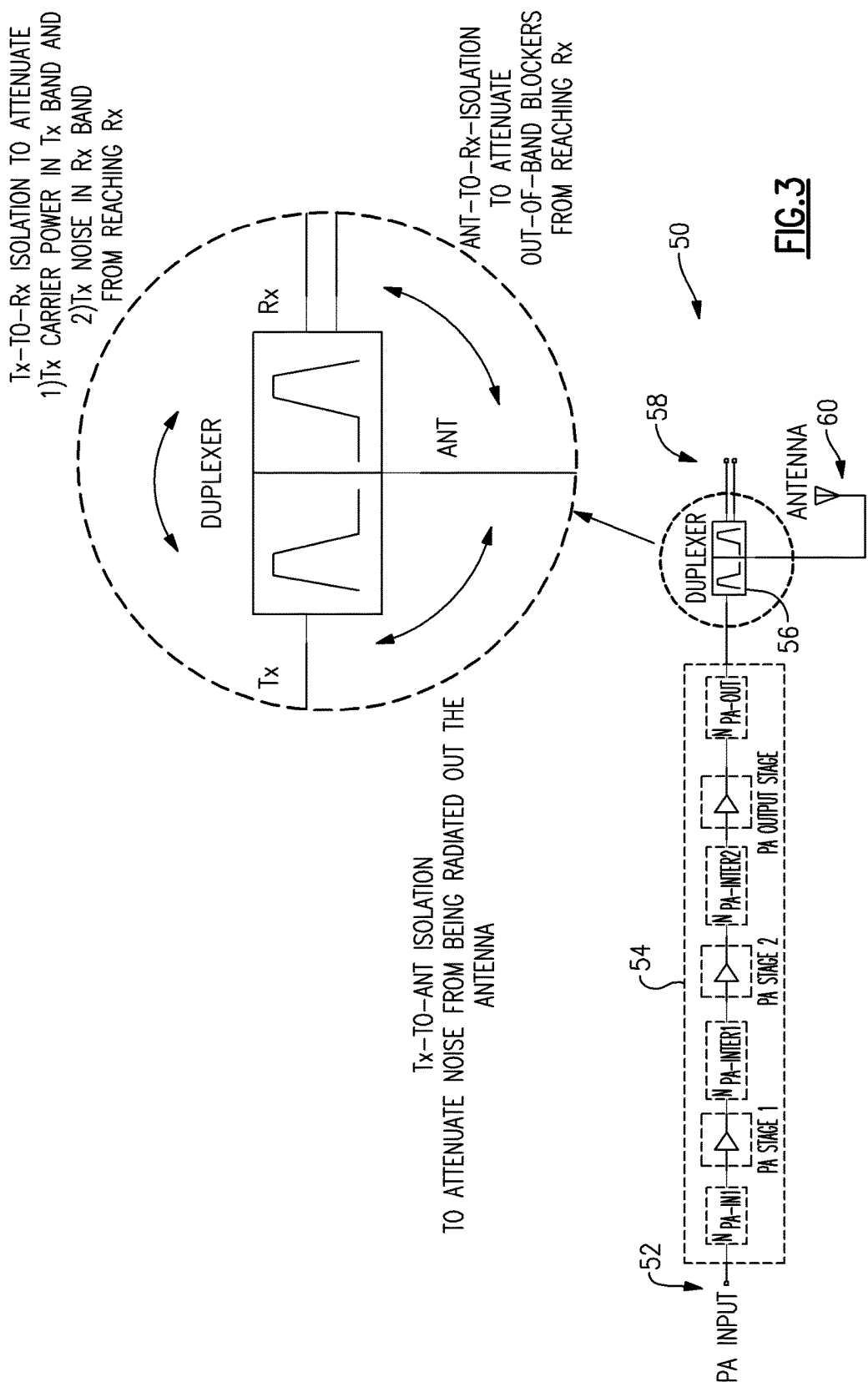
FIG. 3 shows an example duplexer configured to provide Tx-Rx isolation, Tx-antenna isolation, and antenna-Rx isolation.

FIG. 3 shows an example duplex filtering configuration 50 that can be implemented to isolate these effects of the transmitter from the sensitive input of the receive chain. A transmit signal from a Tx circuit (not shown) can be received at an input node 52 for amplification by an amplifier 54. The amplified transmit signal is shown to pass through a duplexer 56 to be transmitted via an antenna 60. The same antenna 60 can receive an incoming signal, which is passed through the duplexer 56 and routed to an Rx circuit (not shown) via a node 58.

The duplexer filter 56 depicted in FIG. 3 can provide a number of functionalities. On the transmit side, the out-of-band noise and spurious signals can be attenuated on the way to the antenna to, for example, avoid radiated violation of cell planning and standards body conformance requirements. On the receive side, similar filtering of out-of-band noise and spurious signals of the Rx band can be attenuated from the antenna to, for example, avoid or reduce performance degradation in the Rx circuit. The duplex filter 56 can be configured so that the coupling of the Tx and Rx filters together can enhance the isolation characteristics directly between the Tx and Rx, and to further isolate the Rx directly from the Tx carrier and noise.

Disadvantages associated with the duplexer filter configuration of FIG. 3 can include, for example, a relatively large size and increased electronics solution area. The duplexer filter configuration can also be a significant cost adder to a given band of application, and such duplexer filtering is typically associated with each band where FDD operation is utilized. Thus, the cost issue can be magnified by the number of bands in the overall radio. Further, such a configuration can yield performance that is lossy in the pass band of the Tx (causing higher power to be transmitted to overcome the Tx filter insertion loss), and lossy in the pass band of the Rx (causing further degradation of the noise floor for the receiver).

To achieve some or all constraints of the duplexer filter's isolation performance design parameter(s), the pass band for the Tx and the pass band of the Rx can be generally made more lossy than if the filters were separate Tx and Rx filters. The coupling, loading, and matching associated with tuning of the 3-terminal duplexer (Tx, Rx, and Ant) can add loss above and beyond that of the filters if they were separate; and in some cases of large isolation requirement, significantly so.

Figure 6:
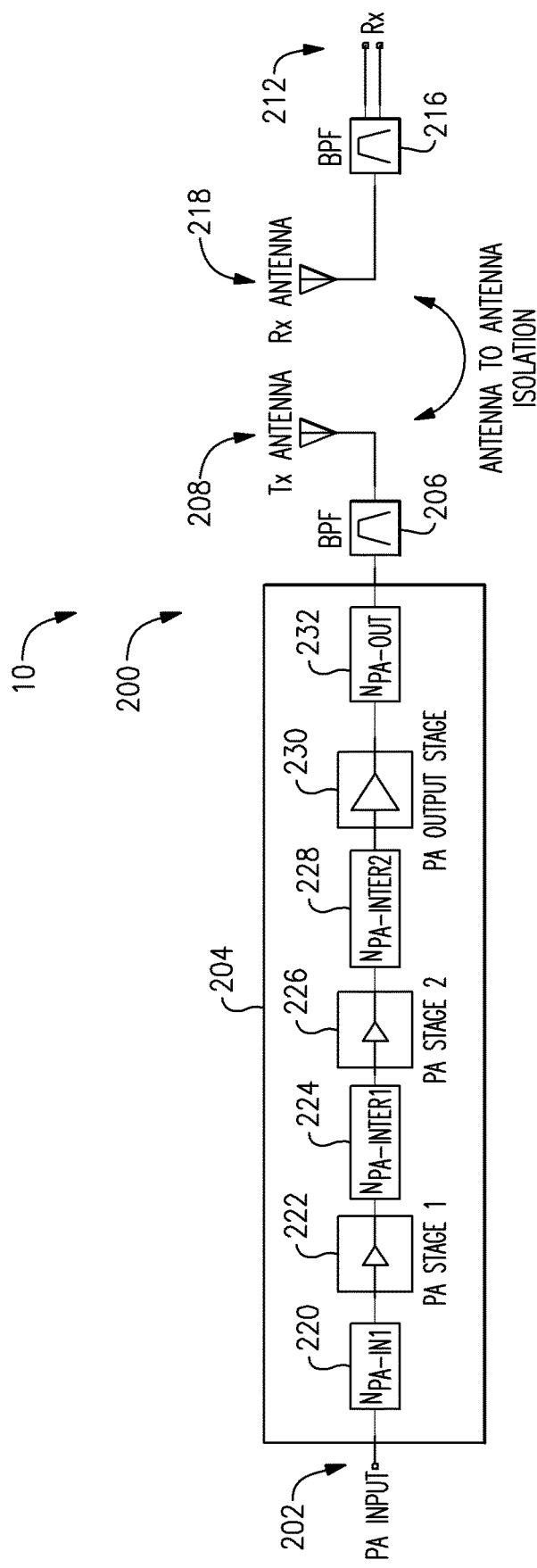
FIG. 6 shows an example RF system having separate Tx and Rx antennas in communication with Tx and Rx paths, respectively, with each path including a filter such as a bandpass filter.

In some implementations, Tx and Rx circuits can be isolated by removing a duplexer, and instead replace it with a separate Tx filter and separate Rx filter. Further, the Tx and Rx paths can be connected to separate dedicated Tx and Rx antennas. FIG. 4 shows a process 100 that can be implemented to achieve such an isolation configuration where first and second antennas are provided. FIGS. 5A and 5B show processes 110, 120 that can be implemented to achieve the separate filtering of signals associated with the Tx and Rx circuits. FIG. 6 shows an example configuration 200 where such separate filters can be implemented with separate antennas to provide isolation between Tx and Rx circuits.

The process 100 of FIG. 4 shows that in block 102, a first path can be formed for transmitting with a first antenna. In block 104, a second path can be formed for receiving with a second antenna to provide antenna-to-antenna isolation. In some embodiments, the first antenna can be a dedicated transmit antenna configured to facilitate transmission of one or more bands of transmit RF signals.

The process 110 of FIG. 5A shows that in block 112, an RF signal to be transmitted can be amplified. In block 114, the amplified RF signal can be filtered by a first filter. In block 116, the filtered RF signal can be provided to a transmit antenna.

The process 120 of FIG. 5B shows that in block 122, an RF signal received from a receive antenna can be filtered by a second filter. In some embodiments, the second filter can be a separate filter from the first filter that filters the RF signal to be transmitted. In block 124, the filtered RF signal can be provided to a receiver circuit.

FIG. 6 shows a configuration 200 that can be an example of the isolation circuit 10 of FIG. 1. The example configuration 200 is shown to include separate antennas 208, 218, where one (208) is used for transmission and the other (218) is used for reception. The transmit antenna 208 is shown to receive a filtered RF signal from a filter 206 (e.g., a bandpass filter). The filter 206 is shown to receive an amplified RF signal from an amplifier 204, which in turn receives an RF signal to be transmitted from a Tx circuit (not shown) through an input node 202. For the purpose of description, the example power amplifier 204 can include a plurality of stages (e.g., input, inter, and output stages 220, 222, 224, 226, 228, 230, 232).

The receive antenna 218 of the example configuration 200 is shown to provide a received RF signal to a filter 216 (e.g., a bandpass filter). The filtered received RF signal is shown to be passed to an Rx circuit (not shown) through an Rx node 212.

In some embodiments, the separate antennas 208, 218 can serve to further isolate the Tx and Rx paths. In some implementations, for a specific level of antenna isolation, the Tx carrier and noise powers can be suppressed at least to approximately the same level as the duplexer-based configuration described herein in reference to FIG. 3. The example configuration 200 can have less in-line insertion loss on both the Tx and the Rx portions, since the configuration can suffer less DC current consumption and power transmitted, as well as less insertion loss and noise figure degradation on the Rx path.

An example benefit in the context of filter insertion loss provided by the configuration of FIG. 6 can include that associated with a SAW (surface acoustic wave) filter based duplexer designed for a Tx band of operation in a range of approximately 1850 MHz-1910 MHz, with a worst case Tx filtering in-band insertion loss of approximately 3 dB, while the attenuation of the out-of-band Tx noise at the Rx frequencies (approximately 1930 MHz-1990 MHz) might be as large as approximately 50 dB. If the same bandpass filter is not constrained with the large isolation requirement, it can achieve a worst case of approximately 2 dB loss and an isolation in the Rx band of approximately 30 dB. Similarly, the Rx performance of the duplexer can yield a worst-case insertion loss from Ant-to-Rx of approximately 3.5 dB, and an attenuation of the Tx carrier frequencies as much as approximately 55 dB. If the same bandpass Rx filter is not constrained with the large isolation requirement, it can achieve a worst case of approximately 2 dB insertion loss and an isolation in the Tx band of approximately 30 dB.

In some implementations, for the separate filters to provide Tx-to-Rx isolation approximately equal to the example duplexer performance, the antenna isolation can be made to be approximately 20 dB (taking into account switch and implementation losses), and the system can then be limited by the Tx carrier isolation of the Rx filtering. In some configurations, a 1 dB savings in the Tx filter loss of this example can translate to at least 20% less DC current at maximum power in the transmitter, due mostly to the power amplifier (PA) outputting 1 dB less power before the filter. The Rx noise figure can be reduced by as much as 1 dB, due to the 1 dB reduction in front-end insertion loss of that path, depending on other de-sensitization from the Tx carrier power and Rx linearity characteristics.

Figure 7:
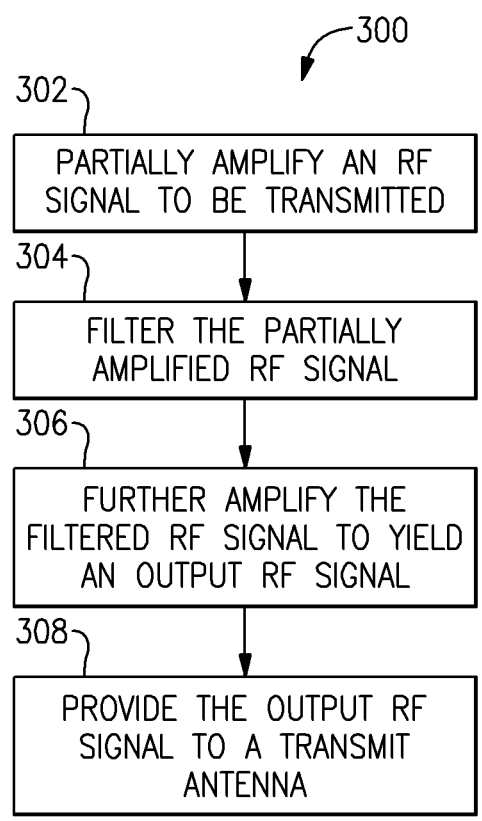
FIG. 7 shows a process that can be implemented to filter a partially amplified RF signal to be transmitted.
Figure 8:
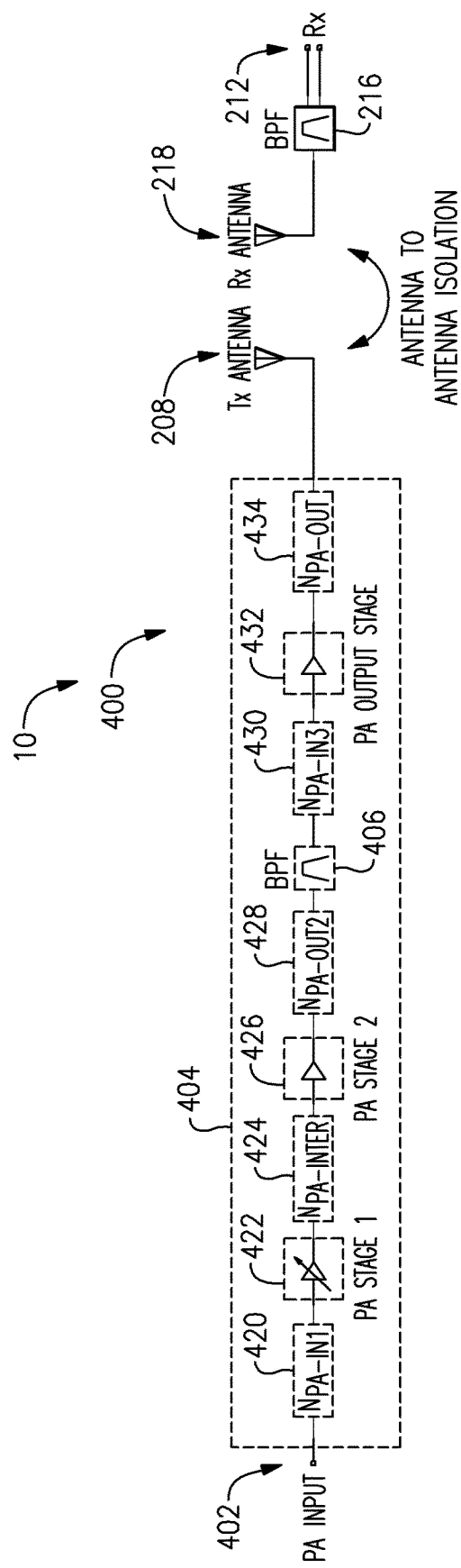
FIG. 8 shows an example RF system having separate Tx and Rx antennas in communication with Tx and Rx paths, respectively, with the Tx path having a power amplifier chain and a bandpass filter within the power amplifier chain.

In some implementations, desirable features of lower post-PA Tx insertion loss and maintaining duplex spacing isolation performance can be achieved by a circuit 400 shown in FIG. 8. Such a circuit can be operated by a process 300 shown in FIG. 7. In block 302, an RF signal to be transmitted can be partially amplified. In block 304, the partially amplified RF signal can be filtered. In block 306, the filtered RF signal can be further amplified to yield an output RF signal. In block 308, the output RF signal can be provided to a transmit antenna.

In the example isolation circuit 400 of FIG. 8, a power amplifier (PA) 404 is shown to include a plurality of interstages and an output stage (e.g., 420, 422, 424, 426, 428, 430, 434, 434). An input node 402 can receive an RF signal to be amplifed, and the amplified RF signal can be provided to a Tx antenna 208. A receive antenna 218 of the example configuration 400 is shown to provide a received RF signal to a filter 216 (e.g., a bandpass filter). The filtered received RF signal is shown to be passed to an Rx circuit (not shown) through an Rx node 212.

In the example configuration 400, a Tx bandpass filter (BPF) following a PA 404 (e.g., such as in an example shown in FIG. 6) can be removed, and a BPF 406 can be placed instead in an interstage before the output stage. In the example shown, the BPF 406 is placed between the second interstage and the output stage. In some embodiments, the output stage can dominate the current consumption, as the strong dependence of the DC current on the output power was demonstrated in the previous example. To further remove loss following the PA, the filter can be moved to an interstage to provide desirable impact on current and noise performance.

In some implementations, the placement of the filter 406 in front of the output stage 432 can have significant effects. For example, power incident to that filter can be at least 10 times lower, thereby allowing relaxation of production requirements and potentially smaller size for a lower power handling rating. Also, the efficiency impact can be greatly reduced on the output stage and remain substantially the same for the driver stages.

In some embodiments, the filter 406 itself can be improved for lower insertion loss because the isolation constraints are relaxed, and the noise contribution of everything in front of the very last stage of the PA 404 can be heavily filtered so that just the final stage effectively contributes noise to the PA output. By inserting the BPF 406 filter into the PA lineup for the specific example shown in Tables 1A-1D, the noise at the output of the PA drops from roughly −135 dBm/Hz to −149 dBm/Hz. Table 1A corresponds to Stage 1 of a configuration where BPF is located after the PA output to yield a 3 dB post-PA Tx DPX insertion loss (with Vcc=3.4V). Table 1B corresponds to Stage 2 of the configuration of Table 1A, where the total Icc is approximately 404.61 mA. Table 1C corresponds to Stage 1 of a configuration where an interstage BPF is provided to yield a 2 dB interstage filtering before the PA's output stage. Table 1D corresponds to Stage 2 of the configuration of Table 1C, where the total Icc is approximately 212.59 mA. For the interstage-BPF of Table 1C, the fTx component has an attenuation of approximately 2 dB to yield a net gain of approximately 14 and net power of approximately 13 dBm when combined with Stage 1. For the fRx component, the interstage-BPF has an attenuation of approximately 30 dB, a net gain of approximately 14, and net noise of approximately −172.54 when combined with Stage 1.

TABLE 1A

|     | Gain1 (dB) | NF1 | Noise1 | Pout1 (dBm) | Eff1 | Icc1 (mA) |
|-----|------------|-----|--------|-------------|------|-----------|
| fTx | 16         |     |        | 16          | 35   | 33.45     |
| fRx | 16         | 10  | −148   |             |      |           |

TABLE 1B

|     | Gain2 (dB) | NF2 | Noise2  | Pout2 (dBm) | Eff2 | Icc2 (mA) |
|-----|------------|-----|---------|-------------|------|-----------|
| fTx | 12         |     |         | 28          | 50   | 371.15    |
| fRx | 12         | 12  | −135.83 |             |      |           |

TABLE 1C

|     | Gain1 (dB) | NF1 | Noise1 | Pout1 (dBm) | Eff1 | Icc1 (mA) |
|-----|------------|-----|--------|-------------|------|-----------|
| fTx | 16         |     |        | 15          | 35   | 26.57     |
| fRx | 16         | 10  | −148   |             |      |           |

TABLE 1D

|     | Gain2 (dB) | NF2 | Noise2   | Pout2 (dBm) | Eff2 | Icc2 (mA) |
|-----|------------|-----|----------|-------------|------|-----------|
| fTx | 12         |     |          | 25          | 50   | 186.02    |
| fRx | 12         | 12  | −149.633 |             |      |           |

Given a duplexer Tx-to-Rx isolation of a standard architecture in the range of about 50 dB, the noise of the standard approach back to the Rx input would be about −185 dBm/Hz. To reach that same level of noise power with the example configuration of FIG. 8, the antenna isolation would have to reach 31 dB (including the insertion loss (IL) of the front-end components on both the Tx and Rx paths before reaching the Rx input pins). This can be challenging, and generally needs to be maintained across conditions of antenna loading and other operating variables; but is believed to be achievable and should improve as orthogonal antenna designs and further isolation innovations are developed.

Also of interest in the examples of Tables 1A-1D is the actual amount of DC current saved by implementing the BPF in the PA and saving 2 dB of loss following the PA. For the specific example shown, the standard approach (Tables 1A and 1B) would consume about 405 mA while the new approach (Tables 1C and 1D) would only consume about 213 mA, for a savings of about 192 mA at max power.

Also calculated in Tables 1A-1D is an equivalent intrinsic PA efficiency that the standard PA would need to have a PAE of about 87% in its output stage to reach this 213 mA number for an output power of 28 dBm. Such a PAE is a significant technological improvement from the current art. In some embodiments, such an improvement can be realized by implementation of architectural configurations having one or more features described herein.

Another notable feature of the example configuration 400 of FIG. 8 is that the input stage for the PA 404 can be made adjustable (e.g., 422) in such a way that its gain and output power compensate for any roll-off in the inter-stage BPF 406. The roll-off for this filter can be less than that for the standard duplexer filter at band edge, but the first stage gain adjustment (through a number of techniques, including, but not limited to, a digital control word to control bias from a serial digital interface, etc.) can compensate without disturbing the delicate balance of nonlinear gain compression and expansion that is allowing the following stages to meet efficiency and linearity targets. It can also compensate for known temperature behavior of the filter insertion loss and roll-off at band edge through this method. These compensations can be more difficult given constraints on the PA output stage for maximum power and back-off from saturation; thus, after the final stage of the PA, it is desirable to have less loss for this reason also.

Figure 12:
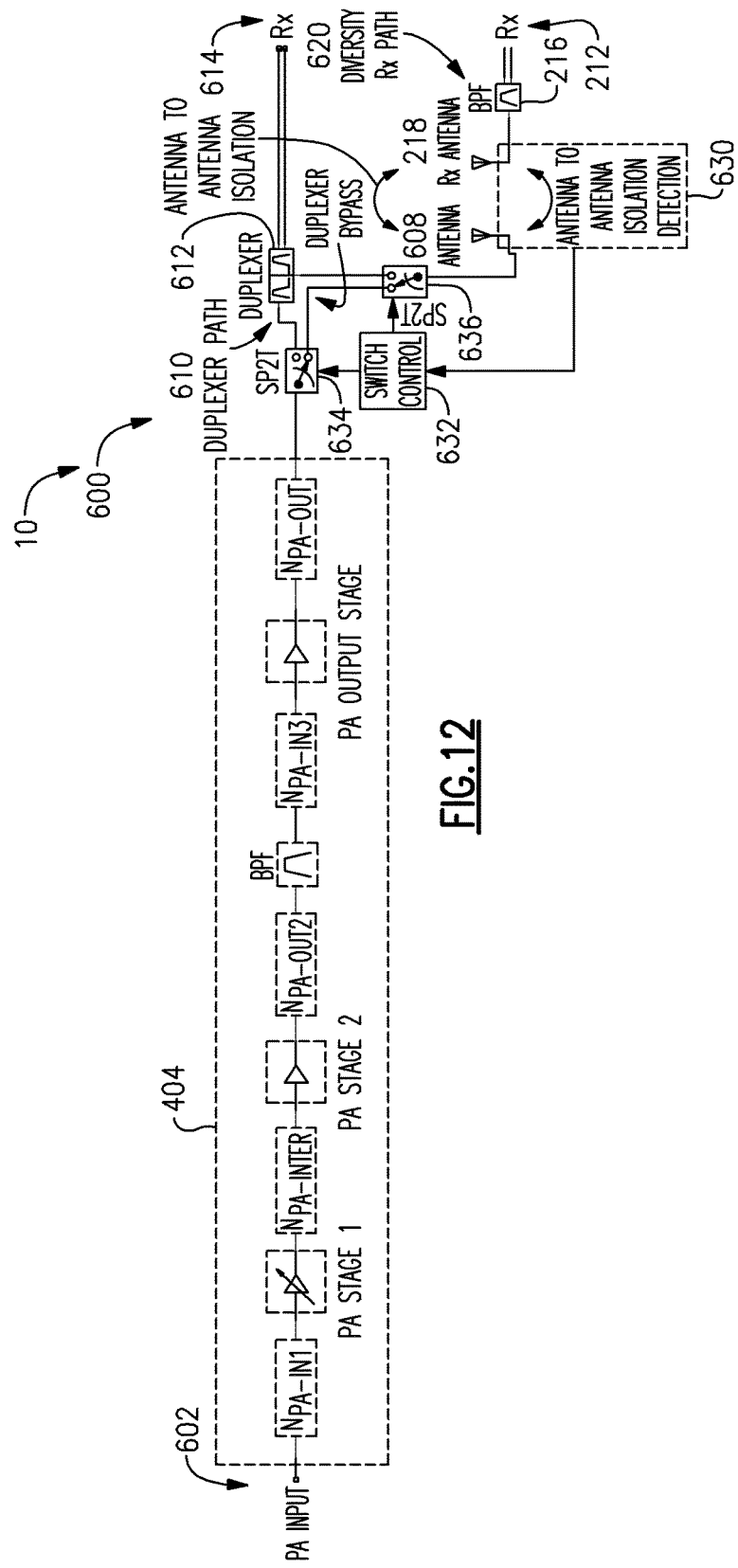
FIG. 12 shows an example RF system having a plurality of antennas and configured to facilitate the various functionalities associated with the processes of FIGS. 9-11.

In some implementations, one or more features associated with the example configuration 400 of FIG. 8 can be combined with one or more features associated with the example configuration 50 of FIG. 3. FIG. 12 shows a configuration 600 that can be an example of such a combination. FIG. 9 shows a process 500 that can be implemented to form such a configuration. FIG. 10 shows a process 510 that can be implemented to determine which mode to operate in and effectuate switching among a plurality of modes associated with the configuration 600. FIG. 11 shows a process 520 that can be implemented to determine a condition for effectuating the switching of the example process 510 of FIG. 10.

In block 502 of the process 500 of FIG. 9, a duplexer path can be provided or formed for transmitting and receiving RF signals via a first antenna. In block 504, a diversity-receive path can be provided or formed for receiving an RF signal via a second antenna. Examples of such different paths and their corresponding antennas are described in greater detail in reference to FIG. 12.

In block 512 of the process 510 of FIG. 10, a determination can be made as to whether to operate in a duplexer mode or a diversity-receive mode. In block 514, one or more switching operations can be performed to facilitate the selected operating mode. Examples of such different modes and switching operations are described in greater detail in reference to FIG. 12.

In block 522 of the process 520 of FIG. 11, a condition for triggering a change in operating mode can be detected. In block 524, a signal to effectuate one or more switching operations can be generated to change the operating mode. Examples of such detection and switching operations are described in greater detail in reference to FIG. 12.

In some situations (e.g., given constraints either in the antenna isolation performance or simply the number of antennas available), it may not be possible to allocate an antenna just for Tx use alone, and it may become necessary to maintain a standard duplexer path following a PA (404) as shown in FIG. 12. Even in such a case, however, one can implement one or more features associated with the configuration 400 described in reference to FIG. 8 to benefit from performance improvements in, for example, current consumption and Rx noise.

In the example configuration 600 of FIG. 12, the PA 404 is depicted as being similar to the example described in reference to FIG. 8. It will be understood, however, that other PA configurations can also be utilized in the configuration 600 of FIG. 12.

The PA 404 is depicted as receiving an RF signal through its input node 602 and filtering the signal before the output stage as described in reference to FIG. 8. The output of the PA 404 can then be routed to a duplexer path 610, through a duplexer 612, and then to a transmit antenna 608 when operated in a duplexer mode. When in the duplexer mode, an RF signal received through the antenna 608 can be routed through the duplexer 612 and then to a receive node 614. To facilitate the duplexer mode of operation, a switch 634 (e.g., an SP2T) can be set to form a connection between the PA 404 and the duplexer 612, and a switch 636 (e.g., an SP2T) can be set to form a connection between the antenna 608 and the duplexer 612.

When in a mode where it is desired to bypass the duplexer 612 (e.g., for a diversity Rx mode described herein), the switch 634 can be set to open the path between the PA 404 and the duplexer 612, and form a connection between the PA 404 and a duplexer bypass which is shown to be connected to one of the throws of the switch 636. The switch 636 can be set to connect the duplex bypass to the antenna 608 to allow transmission of the filtered-and-amplified RF signal from the PA 404, and to open the path between the antenna 608 and the duplexer 612 to thereby disable the receive functionality of the duplexer 612.

In such a mode (e.g., diversity mode), a separate Rx antenna 218 is shown to provide a received RF signal to a diversity Rx path 620. Such a path can include a filter 216 (e.g., a BPF) to allow filtering of the received signal and providing the filtered signal to a receive node 212 in a manner similar to that described in reference to FIG. 8.

In some implementations, the configuration shown in FIG. 12 can be utilized to facilitate, for example, emerging communication standards where increasing use of diversity can include an addition of an extra Rx path. A seperate antenna connection is commonly configured to be seperated enough in distance to be considered a different RF environment and path, so that an RF signal received can then be correlated with the main path Rx to gain a signal-to-noise ratio (SNR) advantage. If the two signals are substantially orthogonal and received at the substantially same power level, then the SNR can be improved by a relatively large amount (e.g., 3 dB or more). The drive for such performance can include a desire for better Rx sensitivity, and the benefit of having seperation and isolation levels between the antennas can benefit some or all of the goals associated with the example configuration 600 of FIG. 12 as well.

In some implementations, the diversity Rx path 620, when not being used to enhance SNR at reduced or lowest signal levels, can be used as described herein to facilitate separate Tx and Rx antennas. The diversity path 620 can be used as the lone Rx path with the antenna 218, and the other antenna 608 can be used for Tx only. Similar to the example of FIG. 8, the configuration of FIG. 12 can include a "Duplexer Bypass" path as described herein which can be switch-selected to remove the loss of the post-PA duplexer and use a PA with embedded BPF interstage before the final stage to reduce the total PA output noise. Again, there exists a challenge of the noise level with reduced post-PA filtering, and constraint of the antenna isolation at around, for example, 31 dB as described herein. However, the example 3 dB savings in post-PA loss can reduce the DC consumption of the PA by around 50%.

In some implementations, the isolation of the switches (634, 636) on either end of the duplexer bypass path can be configured so that their sum is greater than the isolation of the duplexer Tx-Ant itself, or the overall performance of the duplexer 612 when it is actively being used can be degraded. In some embodiments, these relatively high isolation switch requirements can be traded off with the insertion loss on those switch poles and the large DC current savings to be gained, and can be achievable at around, for example, 30-35 dB worst case.

In some implementations, the architecture of FIG. 12 can be configured so that it can be engaged at different points in an overall dynamic range. For example, starting at maximum power where Tx carrier attenuation and noise can be most critical, one might leverage the availability of the duplexer if necessary or desired to meet noise requirements. At a backed-off power, where the noise requirements can be relaxed for self-desensitization and the system can have margin against requirements, the duplexer can be by-passed for large current savings at that point. Such an approach can have less benefit for the maxmium power DC currents where they are largest, but still can have significant benefit when engaged. By way of an example, and in a statistical context, the WCDMA (Wideband Code Division Multiple Access) standard is one example where the majority of the time Tx is operated significantly backed off from maximum power, so that the advantages of the foregoing approach can make a substantial difference. Such an advantage may be less significant for LTE at current cell planning build-out; but as capacity drives pico-cells and smaller cell footprints, the transmit powers will likely go down in mature systems, leading to more opportunity for this example solution to gain advantage.

In some implementations, the architecture of FIG. 12 can be configured to accommodate a situation where antenna isolation is important to the performance of the system, and varies in operation depending on load. As shown in FIG. 12, a system which detects the extent of the antenna coupling (e.g., through diversity reception and SNR analysis, forward and reflected coupler measurement on the antenna feeds, direct sniffing of the Tx coming through the diversity path relative to an initial calibration reference value, or other such comparable techniques) and can feed this information back to set the control of the duplexer bypass path to either engage or disengage based on knowledge of the antenna environments. In FIG. 12 the foregoing system is schematically depicted as 630, and the engaging and disengaging of the duplexer bypass can be effectuated by, for example, a switch control 632 that controls the states of the switches 634, 636 based on the information provided by the system 630. In some embodiments, such a system and/or bypass control can be implemented through a front-end serial digital interface driven from the transceiver or baseband that controls the PA, switches, and other active circuitry of the front-end.

Figure 13:
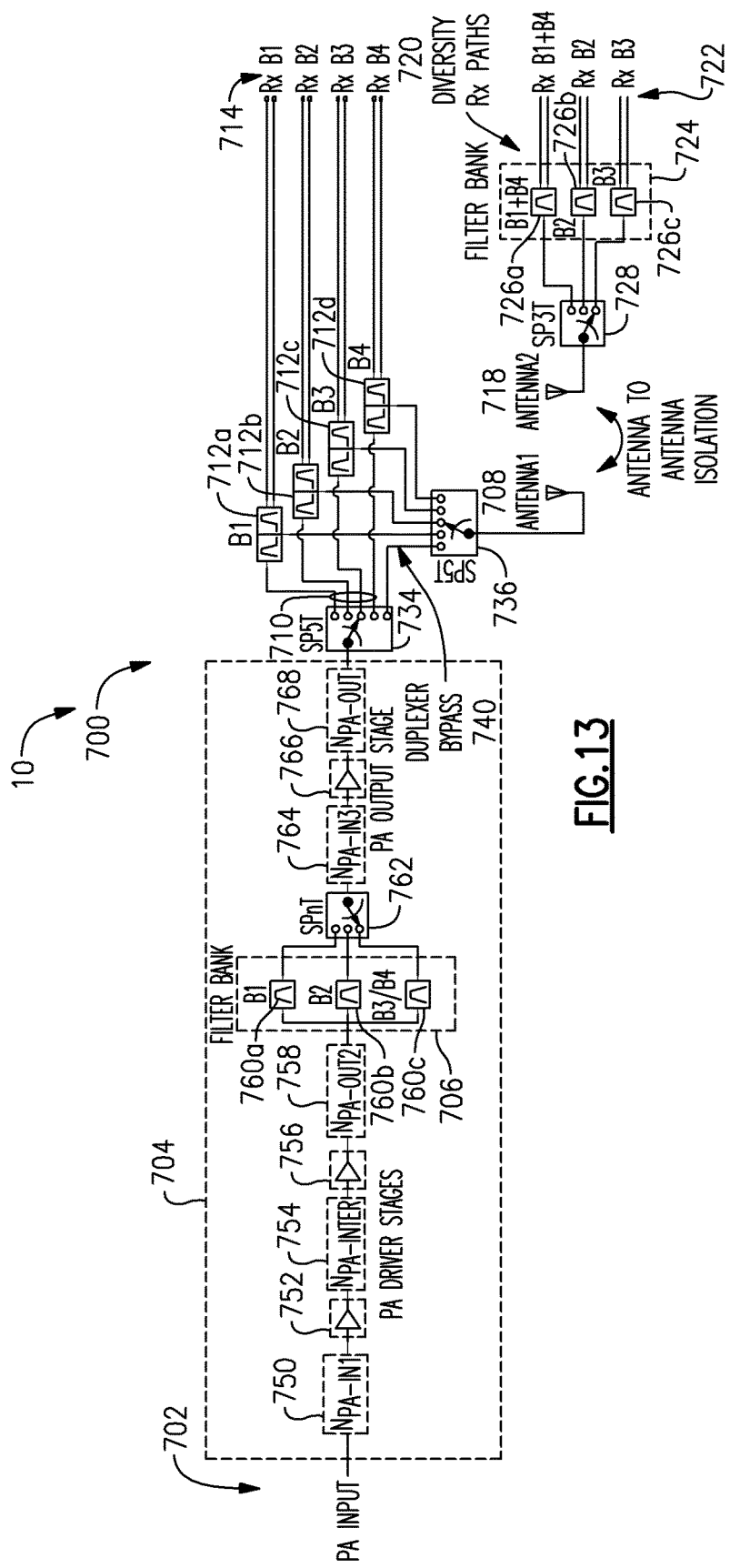
FIG. 13 shows an example multi-band RF system configured to implement one or more features of the present disclosure.

FIG. 13 shows an architecture 700 that is similar to the example of FIG. 12, but configured to accommodate a plurality of frequency bands. The example architecture 700 is described in the context of an example 3GPP quad-band configuration. However, it will be understood that the number of bands can be greater or less than four. Also, one or more features associated with the multi-band example 700 can be implemented in other wireless standards.

In the example configuration 700, a PA 704 is shown to receive an RF signal to be transmitted through an input node 702 and amplify the signal at different stages (750, 752, 754, 756, 758, 764, 766, 768). As with the example described in reference to FIG. 12, filtering can be performed before the PA's output stage. In the example shown, a filter bank 706 is shown to have a plurality of filters to accommodate different bands. A filter 760a (e.g., a BPF) is shown to provide filtering for band B1, a filter 760b (e.g., a BPF) is shown to provide filtering for band B2, a filter 760c (e.g., a BPF) is shown to provide filtering for bands B3 and B4. It will be understood that the filter bank 706 can be configured differently with different numbers of filters. A given signals can be routed to a selected one of such filters by a switch 762 (e.g., a SP3T switch) to yield a desired filtered signal.

Similar to the example of FIG. 12, a filtered and amplified signal output from the PA 704 can be routed to a duplexer path (collectively indicated as 710) or a duplex bypass path 740. The duplexer path 710 is shown to include separate duplexers (712a, 712b, 712c, 712d) for the four example bands B1, B2, B3, B4. On the PA side, each of the duplexers is shown to be connectable to the PA output via a switch 734 (e.g., a SP5T switch). On the transmit antenna side, each of the duplexers is shown to be connectable to a first antenna 708 via a switch 736 (e.g., SP5T switch). On the receive side, each of the duplexers is shown to connected to a corresponding Rx node 714. It will be understood that the duplexer path 710 can be configured differently with different numbers of bands.

Similar to the example of FIG. 12, when a duplexer operation is not desired, the PA's output (of a selected band) can be routed to the duplexer bypass 740 by appropriate settings of the switches 734, 736 to pass the signal to the first antenna for transmission. For Rx signals, a plurality of band channels and their corresponding Rx paths 720 (e.g., diversity Rx paths) can be provided. In the example shown, a second antenna 718 is shown to be connectable to different filters (e.g., BPFs) of a filter bank 724 via a switch 728 (e.g., SP3T switch) to provide selection of a frequency band. Three example filters 726a, 726b, 726c are shown to accommodate the three example channels (B1+B4, B2, B3), and signals from such channels can be routed to their respective Rx nodes 722. It will be understood that the Rx paths 720 and their corresponding filters can be configured differently with different numbers of bands and filters.

In some implementations, the four example bands B1-B4 described in the example architecture 700 of FIG. 13 can include 3GPP bands listed in Table 2. Various values listed in Table 2 are approximate.

TABLE 2

| Band | Tx | Rx |
| --- | --- | --- |
| B1 | 1920-1980 MHz | 2110-2170 MHz |
| B2 | 1850-1910 MHz | 1930-1990 MHz |
| B3 | 1710-1785 MHz | 1805-1880 MHz |
| B4 | 1710-1755 MHz | 2110-2155 MHz |

It is noted that for this example implementation, the Tx bands of B3 and B4 overlap substantially, and the Rx bands of B1 and B4 overlap substantially, thereby enabling some consolidation of filters and their corresponding paths. Such consolidations are described by way of examples in reference to FIG. 13.

In some embodiments, consolidation can also be implemented for functionalities provided by the duplexers. For example, the separate duplexers shown in FIG. 13 can be replaced as follows. B1 and B4 duplexers can be replaced with a triplexer of B1 Tx/B4 Tx/B1 B4 Rx, and/or B3 and B4 duplexers can be replaced with a triplexer of B3 B4 Tx/B3 Rx/B4 Rx. In another example, the consolidation can be extended further, where B1, B3, and B4 duplexers can be replaced with a quadplexer of B1 Tx/B3 B4 Tx/B3 Rx/B1 B4 Rx. In some situations, the foregoing filter consolidations can increase the insertion losses of the filters, thereby making the bypassing feature more attractive.

In some implementations, the use of duplexer bypassing across dynamic range can carry an additional complexity associated with many modern communications systems requiring accurate steps in power in response to requests from a node B or basestation. To maintain consistent gain stepping while making such a significant change in output impedance presented to the PA and Tx path insertion loss, careful calibration and/or real time correction can be implemented to manage the accuracy of the gain change over, for example, power, frequency, VSWR and/or temperature.

In some embodiments, overall system cost, size, and/or preformance overhead of the duplexer bypass feature described herein can be implemented to be manageable. Such implementations can include the extra pole(s) on one or more switches and desired isolation performance across such switches and between antennas, as well as additional BPF filter(s) and switch(es) embedded in an interstage of the PA. In some embodiments, increase in cost and size of the PA due to such implementations can be weighed against the potential benefit of improved DC power consumption and efficiency.

Figure 14:
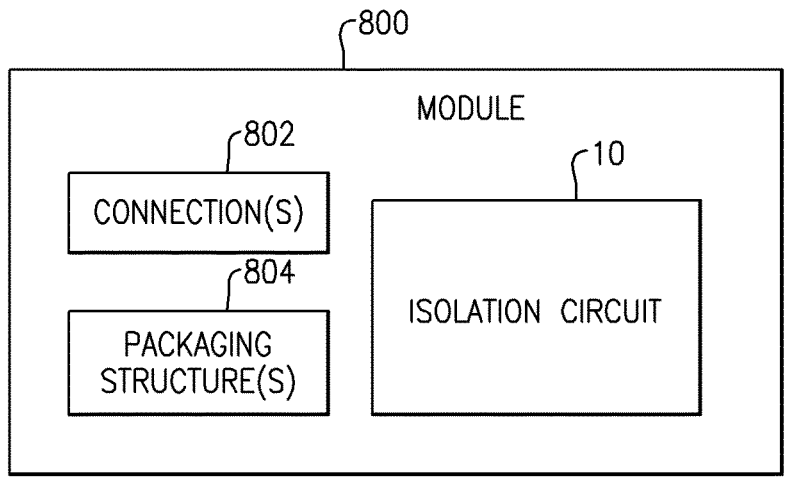
FIG. 14 schematically shows that an isolation circuit having one or more features of the present disclosure can be implemented in one or more modules.

FIG. 14 shows that in some embodiments, an isolation circuit 10 having one or more features described herein can be part of a packaged module 800. The module 800 can also include a packaging substrate, such as a laminate substrate, configured to receive a plurality of components. The module 800 can also include one or more connections to facilitate providing of signals to and from the isolation circuit 10. The module 800 can also include various packaging structures 804. For example, an overmold structure can be formed over the isolation circuit 10 to provide protection from external elements.

In some embodiments, one or more features of the present disclosure can be implemented in one or more modules. For example, some or all functionalities associated with the isolation circuit 10 can be implemented in a PA module, a front end module, or some combination thereof.

In some embodiments, the isolation circuit 10 that is part of the module 800 can be implemented on one or more semiconductor dies. In some embodiments, the module 800 can include a front end module configured for use in RF devices such as wireless devices.

Figure 15:
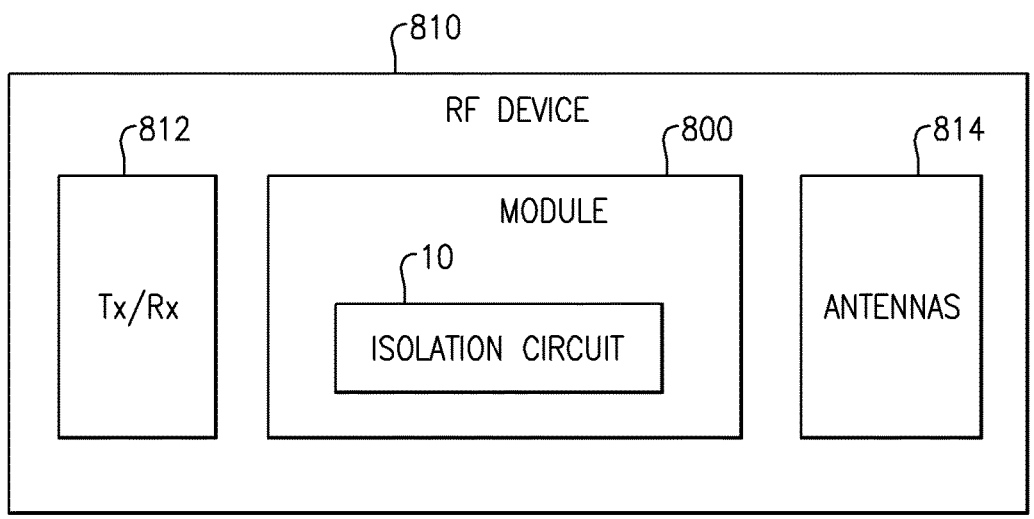
FIG. 15 schematically shows that an isolation circuit having one or more features of the present disclosure can be implemented in an RF device.

FIG. 15 shows that in some embodiments, a module 800 having an isolation circuit 10 can be included in an RF device 810 such as a wireless device. Such a wireless device can include, for example, cellular phone, a smart phone, etc. In some embodiments, the isolation circuit 10 can be implemented in a packaged module such as the example of FIG. 14. The RF device 810 is depicted as including other common components such a transceiver circuit 812. In some embodiments, the RF device 810 can include a plurality of antennas 814 to facilitate the antenna-to-antenna isolation functionality described herein.

In some implementations, an architecture, a device and/or a circuit having one or more features described herein can be included in an RF device such as a wireless device. Such an architecture, a device and/or a circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless access point, a wireless base station, etc.

Figure 16:
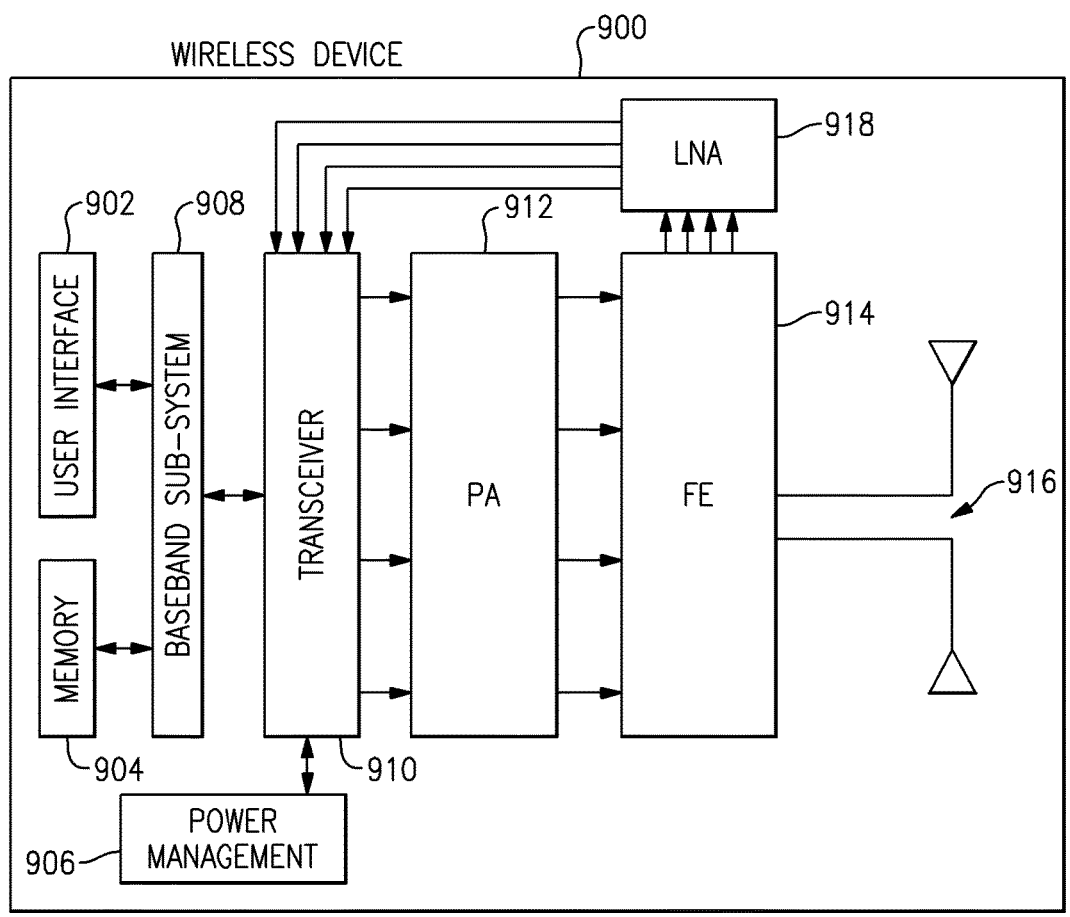
FIG. 16 schematically shows an example wireless device having one or more features of the present disclosure.

FIG. 16 schematically depicts an example wireless device 900 having one or more advantageous features described herein. In some embodiments, such advantageous features can be implemented in a PA module 912, in a front-end (FE) module 914, with one or more antennas 916, or some combination thereof.

PAs in the PA module 912 can receive their respective RF signals from a transceiver 910 that can be configured and operated in known manners to generate RF signals to be amplified and transmitted, and to process received signals. The transceiver 910 is shown to interact with a baseband sub-system 908 that is configured to provide conversion between data and/or voice signals suitable for a user and RF signals suitable for the transceiver 910. The transceiver 910 is also shown to be connected to a power management component 906 that is configured to manage power for the operation of the wireless device 900. Such power management can also control operations of the baseband sub-system 908 and other components of the wireless device 900.

The baseband sub-system 908 is shown to be connected to a user interface 902 to facilitate various input and output of voice and/or data provided to and received from the user. The baseband sub-system 908 can also be connected to a memory 904 that is configured to store data and/or instructions to facilitate the operation of the wireless device, and/or to provide storage of information for the user.

In the example wireless device 900, outputs of the PAs of the PA module 912 are shown to be provided to the FE module 914. Functionalities such as band-selection can be implemented in the FE module 914. In FIG. 16, received signals are shown to be routed from the FE module to one or more low-noise amplifiers (LNAs) 918. Amplified signals from the LNAs 918 are shown to be routed to the transceiver 910.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A wireless device comprising:
   a power amplifier including a power amplifier output configured to provide a transmit signal;

one or more duplexers including a first duplexer associated with a first frequency band;
a plurality of antennas including a first antenna and a second antenna;
a plurality of switches configured to selectively connect the power amplifier output to the first antenna via a selected path chosen from a plurality of signal paths, the plurality of signal paths including a first signal path through the first duplexer and a duplexer bypass path that bypasses the one or more duplexers; and
an isolation detection system configured to control the selected path of the plurality of switches based on detecting an amount of antenna coupling between the first antenna and the second antenna, and to control switching between a duplexer mode in which the power amplifier output is connected to the first antenna through the one or more duplexers, and a duplexer bypass mode in which the power amplifier output is connected to the first antenna via the duplexer bypass path, the isolation detection system further configured to control switching between the duplexer mode and the duplexer bypass mode based on the detected amount of antenna coupling.

2. The wireless device of claim 1 wherein the power amplifier includes an input stage, a filter bank, and an output stage connected in an amplification path.

3. The wireless device of claim 2 wherein the input stage is a variable-gain stage configured to compensate for a variation of insertion loss of the filter bank.

4. The wireless device of claim 2 wherein the filter bank includes a plurality of filters configured to provide filtering of a plurality of different frequency bands, the power amplifier further including a multi-throw switch configured to select one of the plurality of filters for operation in the amplification path of the power amplifier.

5. The wireless device of claim 1 wherein the power amplifier operates without a post filter at the power amplifier output.

6. The wireless device of claim 1 wherein the one or more duplexers further includes a second duplexer associated with a second frequency band, the plurality of signal paths further including a second signal path from the power amplifier output to the first antenna through the second duplexer.

7. The wireless device of claim 1 wherein when the selected path is the first signal path, the first antenna is configured to provide a first receive signal to a receive node via the first duplexer.

8. The wireless device of claim 7 wherein the second antenna is configured to provide a second receive signal to a diversity path.

9. The wireless device of claim 1 wherein the isolation detection system is configured to detect the amount of antenna coupling between the first antenna and the second antenna based on a diversity reception and signal to noise ratio analysis.

10. The wireless device of claim 1 wherein the isolation detection system is configured to detect the amount of antenna coupling between the first antenna and the second antenna based on a forward and reflected coupler measurement.

11. The wireless device of claim 1 wherein the isolation detection system is configured to detect the amount of antenna coupling between the first antenna and the second antenna based on a comparison of a detected amount of the transmit signal coming through a diversity path relative to an initial calibration reference value.

12. A radio frequency system comprising:
a power amplifier module including a power amplifier output configured to provide a transmit signal;
one or more low noise amplifiers; and
a front end module configured to control access of the power amplifier module and the one or more low noise amplifiers to a plurality of antennas including a first antenna and a second antenna, the front end module including one or more duplexers including a first duplexer associated with a first frequency band, and a plurality of switches configured to selectively connect the power amplifier output to the first antenna via a selected path chosen from a plurality of signal paths, the plurality of signal paths including a first signal path through the first duplexer and a duplexer bypass path that bypasses the one or more duplexers, the front end module further including an isolation detection system configured to control the selected path of the plurality of switches based on detecting an amount of antenna coupling between the first antenna and the second antenna, and to control switching between a duplexer mode in which the power amplifier output is connected to the first antenna through the one or more duplexers, and a duplexer bypass mode in which the power amplifier output is connected to the first antenna via the duplexer bypass path, the isolation detection system further configured to control switching between the duplexer mode and the duplexer bypass mode based on the detected amount of antenna coupling.

13. The radio frequency system of claim 12 wherein the one or more duplexers further includes a second duplexer associated with a second frequency band, the plurality of signal paths further including a second signal path from the power amplifier output to the first antenna through the second duplexer.

14. The radio frequency system of claim 12 wherein the isolation detection system is configured to detect the amount of antenna coupling between the first antenna and the second antenna based on a diversity reception and signal to noise ratio analysis.

15. The radio frequency system of claim 12 wherein the isolation detection system is configured to detect the amount of antenna coupling between the first antenna and the second antenna based on a forward and reflected coupler measurement.

16. The radio frequency system of claim 12 wherein the isolation detection system is configured to detect the amount of antenna coupling between the first antenna and the second antenna based on a comparison of a detected amount of the transmit signal coming through a diversity path relative to an initial calibration reference value.

17. A method for isolating radio frequency signals during transmit and receive operations, the method comprising:
generating a transmit signal at an output of a power amplifier based on amplifying a radio frequency signal;
detecting an amount of antenna coupling between a first antenna and a second antenna using an isolation detection system;
controlling a selected path through a plurality of switches based on the amount of antenna coupling detected by the isolation detection system, the selected path chosen from a plurality of signal paths including a signal path through a duplexer and a duplexer bypass path that bypasses the duplexer;
controlling switching with the isolation detection system based on the detected amount of antenna coupling between a duplexer mode in which the output of the power amplifier is connected to the first antenna through the duplexer, and a duplexer bypass mode in which the output of the power amplifier is connected to the first antenna via the duplexer bypass path; and connecting the output of the power amplifier to the first antenna via the selected path using the plurality of switches.

18. The method of claim 17 wherein generating the transmit signal includes generating an amplified signal using a variable-gain stage of the power amplifier, filtering the amplified signal using a filter bank, and compensating for a variation of insertion loss of the filter bank using the variable-gain stage.

19. The method of claim 17 further comprising providing a first receive signal from the first antenna to a receive node via the duplexer.

20. The method of claim 19 further comprising providing a second receive signal from the second antenna to a diversity path.

* * * * *